(12) United States Patent
Kreitzer

(10) Patent No.: US 6,301,056 B1
(45) Date of Patent: Oct. 9, 2001

(54) HIGH SPEED RETROFOCUS PROJECTION TELEVISION LENS SYSTEMS

(75) Inventor: Melvyn H. Kreitzer, Cincinnati, OH (US)

(73) Assignee: Corning Precision Lens, Cincinnati, OH (US)

( * ) Notice: Subject to any disclaimer, the term of this patent is extended or adjusted under 35 U.S.C. 154(b) by 0 days.

(21) Appl. No.: 09/435,586

(22) Filed: Nov. 8, 1999

(51) Int. Cl.[7] .................................. G02B 3/00; H04N 5/74
(52) U.S. Cl. .................... 359/649; 359/650; 359/651; 359/648; 359/715; 359/716; 359/753; 359/782; 359/784; 348/781
(58) Field of Search ........................... 359/648, 649–651, 359/753, 782, 784, 715, 716; 348/776, 778, 779, 781

(56) References Cited

U.S. PATENT DOCUMENTS

| Re. 35,310 | | 8/1996 | Moskovich | 359/649 |
|---|---|---|---|---|
| 4,755,028 | * | 7/1988 | Moskovich | 359/650 |
| 4,776,681 | * | 10/1988 | Moskovich | 359/649 |
| 4,801,196 | * | 1/1989 | Betensky | 359/649 |
| 4,815,831 | * | 3/1989 | Betensky | 359/649 |
| 4,900,139 | | 2/1990 | Kreitzer | 359/649 |
| 4,976,525 | * | 12/1990 | Matsumura et al. | 359/649 |
| 5,016,994 | * | 5/1991 | Braat | 359/650 |
| 5,200,814 | | 4/1993 | Hirata et al. | 358/60 |
| 5,272,540 | | 12/1993 | Hirata et al. | 358/237 |
| 5,309,283 | | 5/1994 | Kreitzer | 359/649 |
| 5,329,363 | | 7/1994 | Moskovich | 348/781 |
| 5,455,713 | | 10/1995 | Kreitzer | 359/649 |
| 5,633,757 | | 5/1997 | Park | 359/650 |
| 5,808,804 | | 9/1998 | Moskovich | 359/649 |
| 6,141,154 | * | 10/2000 | Kreitzer | 359/651 |

FOREIGN PATENT DOCUMENTS

| 833 179 A1 | 4/1998 | (EP) . |
|---|---|---|
| WO97/41477 | 11/1997 | (WO) . |
| WO99/03006 | 1/1999 | (WO) . |
| WO99/67662 | 12/1999 | (WO) . |

\* cited by examiner

Primary Examiner—Evelyn A Lester
(74) Attorney, Agent, or Firm—Maurice M. Klee

(57) ABSTRACT

Projection lens systems (13) for use in CRT projection televisions (10) are provided. From the screen side, the systems have three lens units (U1, U2, U3), the first two units (U1, U2) forming a retrofocus lens and the third unit (U3) being associated with the CRT during use and serving to correct field curvature. At its screen end, the first lens unit (U1) has a negative element (E1) which has a screen surface (S1) which is concave to the screen. The second lens unit (U2) has two positive subunits ($U_{S1}$, $U_{S2}$), the first subunit ($U_{S1}$) being a color correcting doublet composed of glass and the second subunit having a positive lens element (E2) at its screen end. The projection lens systems are fully color corrected, have f/#'s of 1.0 for an infinite conjugate, have half fields of view of at least 25°, and are economical to manufacture.

20 Claims, 5 Drawing Sheets

HIGH SPEED RETROFOCUS PROJECTION TELEVISION LENS SYSTEMS

FIELD OF THE INVENTION

This invention relates to projection lens systems for use in projection televisions.

BACKGROUND OF THE INVENTION

There exists a need in the art for a projection lens system and, in particular, a rear projection lens system, that has some and preferably all of the following properties:

(1) The system is fully color corrected.
(2) The system is a high speed system, e.g., it has an infinite conjugate f/# of 1.0.
(3) The system has a wide field of view in the direction of the screen, e.g., a half field of view in the direction of the screen of at least 25°.
(4) The system produces a high quality image, e.g., the system has an MTF above 0.5 at 10 cycles/millimeter.
(5) The quality of the image is insensitive to changes in temperature of the lens system, e.g., changes between room temperature and the system's operating temperature.
(6) The system produces an image which is bright in the corners, e.g., the pupil area in the corner is at least 50% of the pupil area on axis.
(7) The system is compact, i.e., its lens elements are spaced close together so that the overall system has a short barrel length.
(8) The system is suitable for use with small diameter cathode ray tubes (CRTs), e.g., it can be used with 3-inch CRTs which have a diagonal of about 65 millimeters.
(9) The system is economical to manufacture.

SUMMARY OF THE INVENTION

To satisfy this need in the art, it is an object of the invention to provide projection lens systems which have some and preferably all of the above nine features.

To achieve this object, the invention provides a projection lens system for use in combination with a cathode ray tube that comprises the following lens units in order from the image (i.e., screen or long conjugate) side:

(a) a negative first lens unit (U1) which comprises: (i) at least one aspheric surface and (ii) a negative lens element (E1) at the unit's image side, said negative lens element having an image side surface (S1) which is concave towards the image;

(b) a positive second lens unit (U2) which comprises the following lens subunits in order from the image side:

(i) a positive first lens subunit ($U_{S2}$) which consists of a cemented color correcting doublet composed of glass and having spherical surfaces; and
  (ii) a positive second lens subunit ($U_{S2}$) which comprises at least one lens element of weak optical power having at least one aspheric surface; and (c) a third lens unit (U3) which has a strong negative power, is associated with the CRT during use of the lens system, and contributes to the correction of the lens system's field curvature.

Compared to the typical CRT projection lens, the U3 unit has reduced negative power, i.e., the ratio of the magnitude of the power of the U3 unit to the overall power of the lens system is relatively small, e.g., less than 0.8 and preferably less than 0.7. This reduction is accomplished through the use of concave surface S1 on lens element E1 which helps correct the field curvature of the lens. As a result, the magnitude of the power of the negative third lens unit (U3) can be reduced. This reduction in power allows the lens to collect more light from the CRT, especially from the corners of the CRT.

The first and second lens units (U1 and U2) have a retrofocus, i.e., a negative-positive, configuration. This configuration allows the combination of these units to have a short focal length and a back focal length which is sufficiently long to accommodate the third lens unit at the CRT faceplate.

In certain preferred embodiments of the invention, all of the lens elements of U1, $U_{S2}$, and U3 are composed of plastic. Thus, for these embodiments, the projection lens system is composed of a cemented glass doublet and plastic lens elements on either side of the doublet. This configuration provides a number of advantages to the lens system.

First, it makes the system inexpensive to manufacture. As illustrated in the examples presented below, the plastic elements of the lens have configurations which allow them to be readily molded in plastic. As also illustrated in the examples, the doublet has spherical surfaces and a relatively small clear aperture diameter (e.g., a clear aperture diameter of less than 65 millimeters and preferably less than 60 millimeters) which allows it to be readily made in glass. Accordingly, each of the components of the system can be readily manufactured at low cost.

Second, the most critical portion of the lens in terms of its optical performance is the second lens unit's first subunit ($U_{S1}$), i.e., the cemented glass doublet. Because of its size and configuration, this doublet can be made with high precision, again at low cost. Accordingly, the use of this doublet provides an effective way to achieve a high level of optical performance in an inexpensive lens.

Third, the plastic-glass-plastic construction of the lenses of the invention, with the glass portion being of strong power, makes the lenses insensitive to changes in temperature. Again, this thermal stability is achieved for a lens that has both a high level of optical performance and a low cost.

In other preferred embodiments, the lens system has some or all of the following characteristics:

(1) to provide a high level of aberration correction, U1 and $U_{S2}$ each have two aspheric surfaces;

(2) again to provide a high level of aberration correction, surface S1 is an aspheric surface;

(3) to aid in the correction of field curvature, $|\Phi_{E1}|/\Phi_0$ is at least 0.15, preferably at least 0.2, and most preferably at least 0.25, where $|\Phi_{E1}|$ is the magnitude of the power of element E1 and $\Phi_0$ is the overall power of the lens system;

(4) to provide the foregoing power level without unduly increasing the curvature of the S1 surface, E1 is preferably biconcave;

(5) to provide a compact lens, $D_{12}/f_0$ (or, equivalently, $D_{12} \cdot \Phi_0$) is less than or equal to 0.25, where $D_{12}$ is the distance between the object side surface of E1 and the image side surface of $U_{S1}$ and $f_0$ is the effective focal length of the lens system ($f_0 = 1/\Phi_0$); and (6) to aid in thermal compensation, $U_{S1}$ is a strong lens unit and the image side lens element (E2) of $U_{S2}$ has a positive power.

When the above preferred embodiments of the invention are used in combination, each of the nine desired features for a CRT projection lens system, listed above, are achieved by the projection lens systems of the invention.

As used herein, the term "weak" is used to describe an element or unit whose focal length has a magnitude which is at least about 2.5 times the effective focal length of the entire lens system, and the term "strong" is used to describe an element or unit whose focal length has a magnitude which is less than about 2.5 times the effective focal length of the entire lens system. Also, the effective focal length and power of the entire lens system, as well as the effective focal length and power of the third lens unit ($\Phi_{U3}$), are determined for the lens system associated with the CRT.

Figure 1:
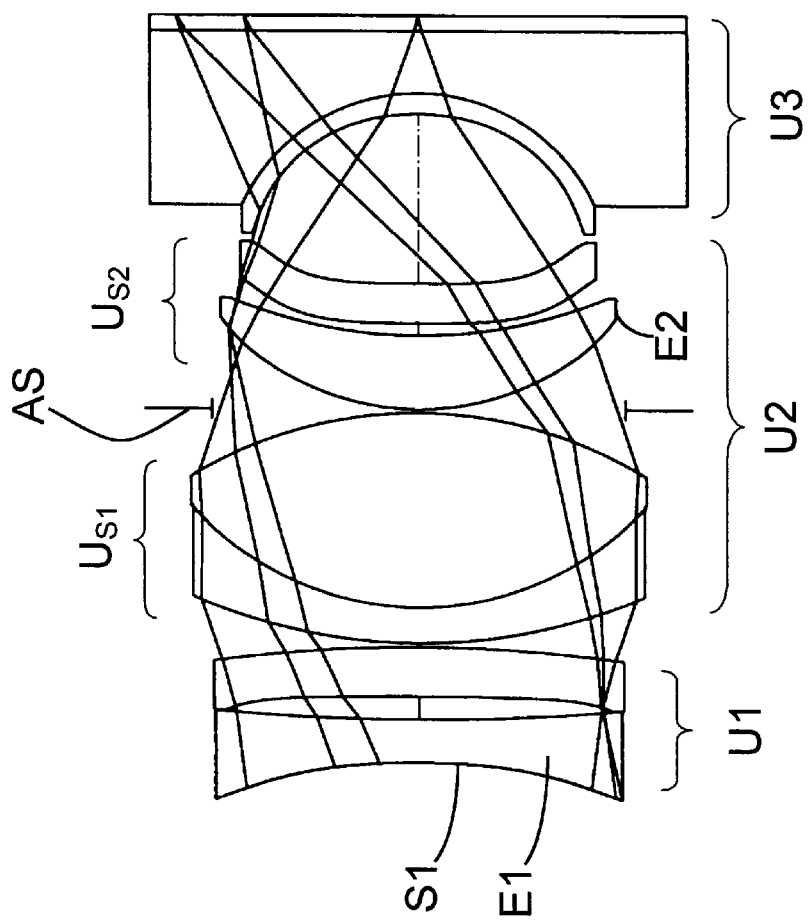
FIGS. 1–4 are schematic side views of lens systems constructed in accordance with the invention.
Figure 2:
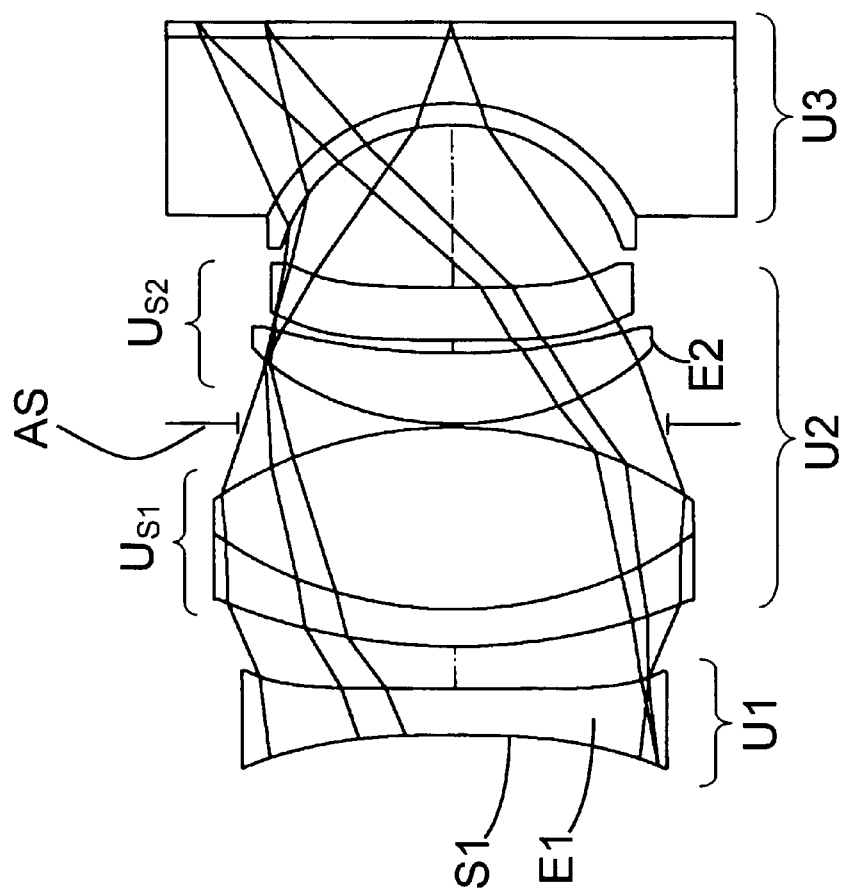
Figure 3:
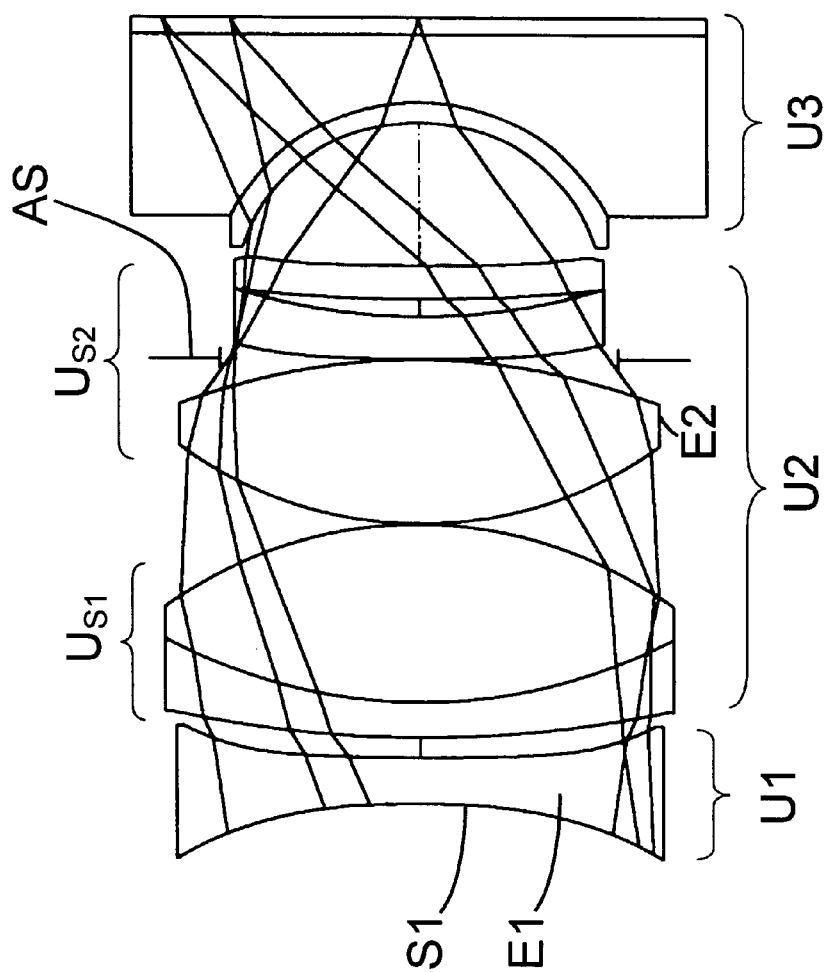
Figure 4:
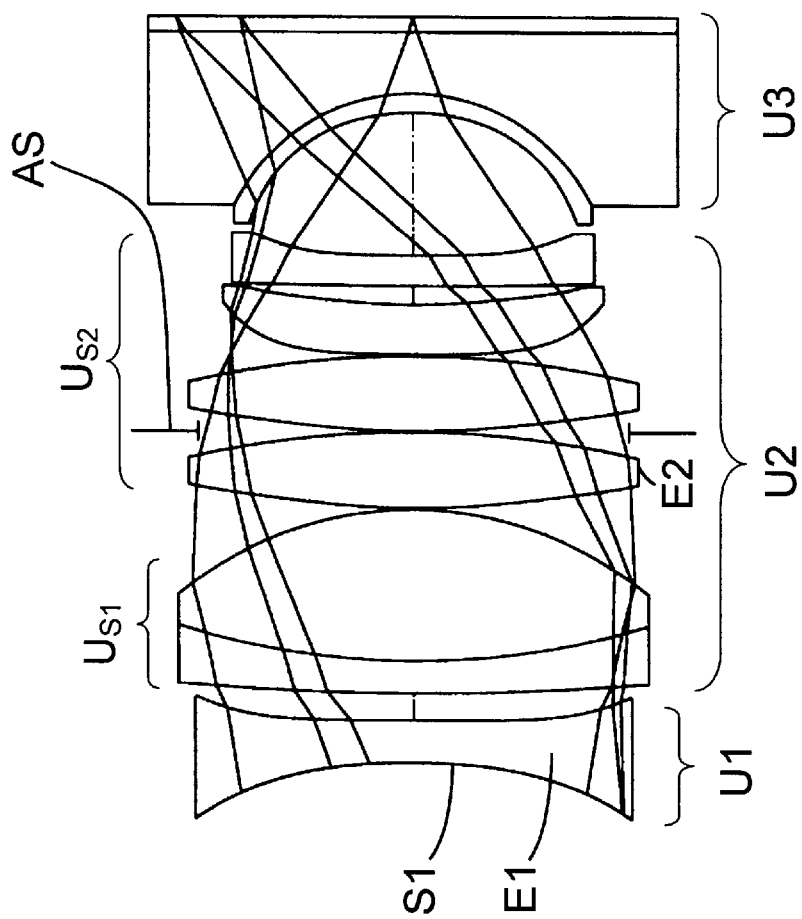

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

FIGS. 1–4 illustrate various projection lenses constructed in accordance with the invention. Corresponding prescriptions appear in Tables 1–4. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–4.

The abbreviations used in the tables are as follows:

| | |
|---|---|
| EFL | effective focal length |
| FVD | front vertex distance |
| f/ | f-number (finite conjugates) |
| ENP | entrance pupil as seen from the long conjugate |
| EXP | exit pupil as seen from the long conjugate |
| BRL | barrel length |
| OBJ HT | object height |
| MAG | magnification |
| STOP | location of aperture stop |
| IMD | image distance |
| OBD | object distance |
| OVL | overall length. |

The designation "a" associated with various surfaces in the tables represents an aspheric surface, i.e., a surface for which at least one of D, E, F, G, H, or I in the above equation is not zero. The designation "c" represents a conic surface, i.e., a surface for which k in the above equation is not zero. The tables are constructed on the assumption that light travels from left to right in the figures. In actual practice, the viewing screen will be on the left and the CRT will be on the right, and light will travel from right to left. The designation "AS" is used in the figures to identify the lens system's aperture stop.

The CRT faceplate constitutes surfaces 15–16 in Tables 1 and 3, surfaces 13–14 in Table 2, and surfaces 17–18 in Table 4. A coupling fluid is located between surfaces 14–15 in Tables 1 and 3, surfaces 12–13 in Table 2, and surfaces 16–17 in Table 4. The material designation for the coupling fluid is set forth as a six digit number in the tables, where an Ne value for the material is obtained by adding 1,000 to the first three digits of the designation, and a Ve value is obtained from the last three digits by placing a decimal point before the last digit. All dimensions given in the prescription tables are in millimeters.

Table 5 summarizes the $|\Phi_{E1}|/\Phi_0$ and $D_{12}/f_0$ values of the projection lens systems of Tables 1–4. ($D_{12} \times \Phi_0 = D_{12}/f_0$) As shown in this table, the lens systems of the examples satisfy the preferred values for these parameters set forth above. The infinite conjugate f/# for each of the projection lens systems of Tables 1–is 1.0 and the ratio of the magnitude of the power of the third lens unit ($|\Phi_{U3}|$) to $\Phi_0$ is less than 0.8. Each of these lens systems is fully color corrected, thermally stable, has a half field of view in the direction of the screen of 27.5°, has an MTF above 0.5 at 10 cycles/millimeter, and produces an image whose pupil area in the corner is at least 50% of the pupil area on axis.

Figure 5:
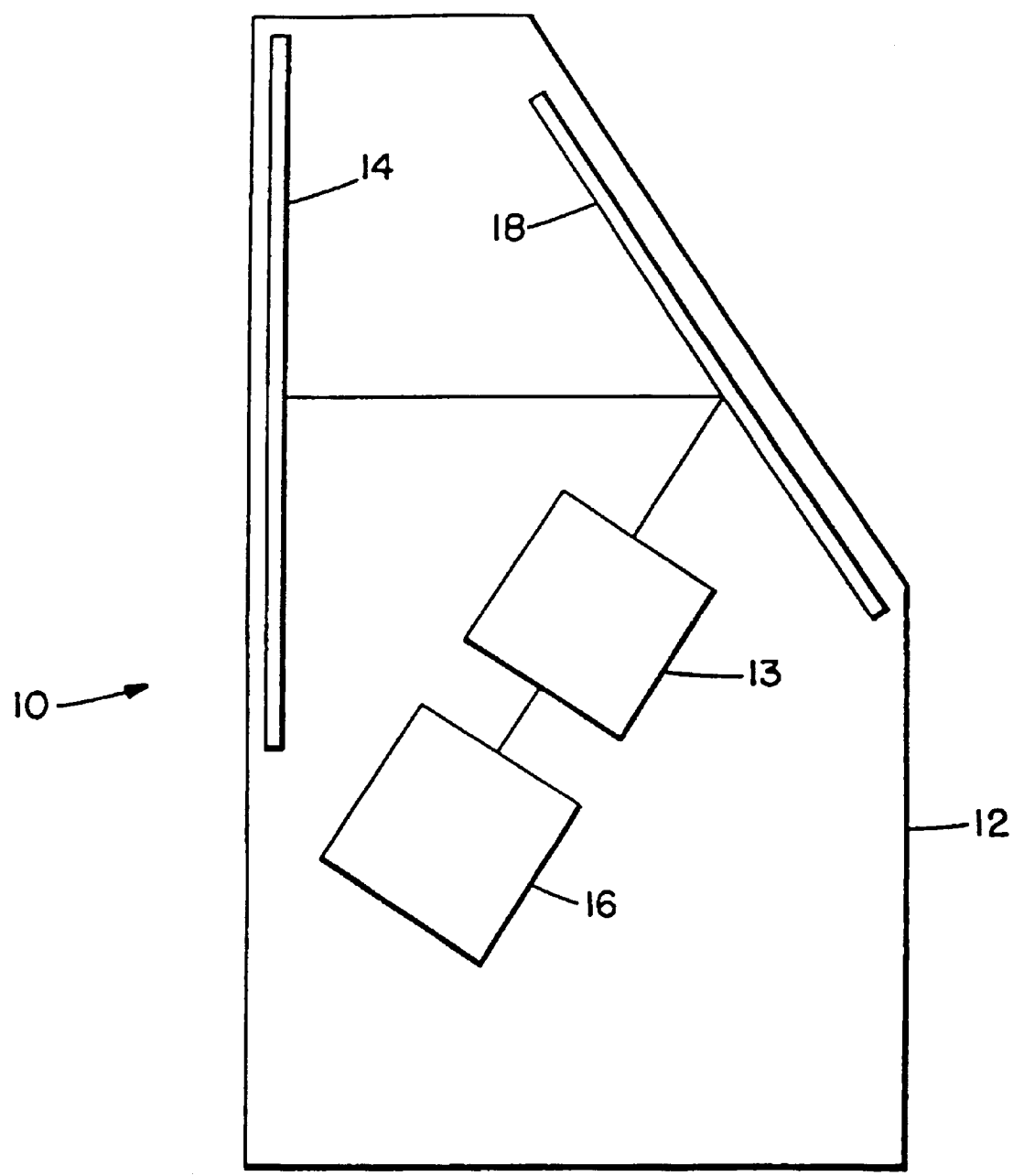
FIG. 5 is a schematic diagram of a projection TV employing a lens system constructed in accordance with the invention.

FIG. 5 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a lens system constructed in accordance with the invention and module 16 illustrates its associated CRT tube. In practice, three lens systems 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | ac | −108.1464 | 5.47000 | ACRYLIC | 51.54 |
| 2 | | 286.6604 | 3.00000 | | 47.00 |
| 3 | a | −500.0000 | 6.41000 | ACRYLIC | 47.00 |
| 4 | | −183.8764 | 0.52000 | | 49.89 |
| 5 | | 71.5889 | 4.56000 | FD10 | 55.12 |
| 6 | | 38.0824 | 25.08000 | SK18A | 55.02 |
| 7 | | −55.0481 | 0.46000 | | 55.67 |
| 8 | | Aperture stop | 0.00000 | | 50.41 |
| 9 | a | 32.3351 | 9.53000 | ACRYLIC | 48.18 |
| 10 | | 61.7951 | 1.57000 | | 46.15 |
| 11 | a | 500.0000 | 5.12000 | ACRYLIC | 45.11 |
| 12 | a | 490.0000 | 21.73000 | | 42.28 |
| 13 | a | −28.7710 | 2.70000 | ACRYLIC | 40.14 |
| 14 | | −24.6181 | 8.00000 | 402500 | 42.81 |
| 15 | | ∞ | 2.00000 | FDS9 | 63.00 |
| 16 | | ∞ | 0.00222 | | 66.00 |

TABLE 1-continued

Symbol Description a - Polynomial asphere
c - Conic section
Even Polynomial Aspheres and Conic Constants

| Surf. No. | k | D | E | F |
|---|---|---|---|---|
| 1 | −4.3933E+00 | −7.7139E−06 | 4.9036E−09 | 4.9665E−12 |
| 3 | | 2.4262E−06 | −8.3820E−09 | −2.9667E−12 |
| 9 | | −1.8765E−06 | 1.5225E−09 | −1.5045E−11 |
| 11 | | 2.0474E−05 | 1.3320E−08 | −2.9386E−11 |
| 12 | | 2.4486E−05 | 1.9039E−09 | 3.7648E−11 |
| 13 | | −3.3649E−05 | 1.9291E−07 | −1.1779E−09 |

| Surf. No. | G | H | I |
|---|---|---|---|
| 1 | −9.4186E−15 | 5.2747E−18 | 1.8607E−22 |
| 3 | 2.5026E−15 | 4.5121E−18 | −1.0186E−20 |
| 9 | 2.3625E−14 | 1.5823E−17 | −1.7883E−20 |
| 11 | 7.0801E−14 | −9.3044E−17 | −6.5831E−20 |
| 12 | −9.6804E−14 | 4.6983E−16 | −1.0605E−18 |
| 13 | 3.8267E−12 | −6.4691E−15 | 3.8064E−18 |

System First Order Properties

OBJ. HT: −610.00    f/  1.07 MAG:    −0.0526
STOP:   0.00 after surface 8. DIA:  50.410
EFL:   44.9043       FVD: 96.1522    ENP: 28.2256
IMD: 0.221537E−02    BRL: 96.1500    EXP: −31.6619
OBD: −894.169        OVL: 990.321

First Order Properties of Elements

| Element Number | Surface Numbers | | Power | f' |
|---|---|---|---|---|
| 1 | 1 | 2 | −0.63171E−02 | −158.30 |
| 2 | 3 | 4 | 0.17092E−02 | 585.07 |
| 3 | 5 | 6 | −0.85049E−02 | −117.58 |
| 4 | 6 | 7 | 0.25491E−01 | 39.229 |
| 5 | 9 | 10 | 0.80585E−02 | 124.09 |
| 6 | 11 | 12 | −0.16743E−04 | −59726. |
| 7 | 13 | 14 | 0.35173E−02 | 284.31 |
| 8 | 14 | 15 | −0.16329E−01 | −61.239 |

First-Order Properties of Doublets

| Element Numbers | | Surface Numbers | | Power | f' |
|---|---|---|---|---|---|
| 3 | 4 | 5 | 7 | 0.17813E−01 | 56.139 |

TABLE 2

| Surf. No. | Type | Radius | Thickness | Glass | Clear Aperture Diameter |
|---|---|---|---|---|---|
| 1 | ac | −188.4224 | 5.47069 | ACRYLIC | 48.84 |
| 2 | a | 573.1565 | 5.11766 | | 47.94 |
| 3 | | 72.3919 | 4.5589 | FD11 | 54.09 |
| 4 | | 48.9493 | 22.41794 | SK18A | 54.40 |
| 5 | | −49.9518 | 0.45589 | | 55.39 |
| 6 | | Aperture stop | 0.00000 | | 49.49 |
| 7 | a | 37.5739 | 8.57922 | ACRYLIC | 45.74 |
| 8 | | 82.9018 | 1.57044 | | 43.00 |
| 9 | a | 603.4897 | 6.37276 | ACRYLIC | 43.22 |
| 10 | a | 799.6455 | 19.55170 | | 39.97 |
| 11 | a | −24.7210 | 2.70000 | ACRYLIC | 38.94 |
| 12 | | ∞ | −24.6181 | 8.00000 | 40250042.06 |
| 13 | | ∞ | 2.00000 | FDS9 | 62.00 |
| 14 | | 0.00531 | | | 66.00 |

TABLE 2-continued

Symbol Description a - Polynomial asphere
c - Conic section
Even Polynomial Aspheres and Conic Constants

| Surf. No. | k | D | E | F |
|---|---|---|---|---|
| 1 | −4.3933E+00 | −1.0207E−05 | 5.5020E−09 | 1.2768E−11 |
| 2 | | −4.1831E−06 | 1.1504E−08 | 1.0166E−11 |
| 7 | | −4.4696E−07 | 6.7055E−09 | −1.7111E−11 |
| 9 | | 1.1408E−05 | 9.3445E−09 | −1.4071E−11 |
| 10 | | 1.6041E−05 | −6.7617E−09 | 3.8184E−11 |
| 11 | | −2.3158E−05 | 1.3009E−07 | −1.0145E−09 |

| Surf. No. | G | H | I |
|---|---|---|---|
| 1 | −1.2666E−14 | −1.6314E−17 | 1.6179E−20 |
| 2 | 1.2060E−15 | −3.7885E−17 | 2.7498E−20 |
| 7 | 8.4366E−15 | 2.3469E−17 | 2.3603E−21 |
| 9 | 5.9708E−14 | −4.9726E−17 | −1.3740E−19 |
| 10 | 9.6888E−15 | 3.0196E−16 | −1.1045E−18 |
| 11 | 3.9497E−12 | −7.0758E−15 | 3.9721E−18 |

System First Order Properties

OBJ. HT: −610.00    f/  1.07 MAG:    −0.0526
STOP:   0.00 after surface 6. DIA:  49.488
EFL:   44.9038       FVD: 86.8005    ENP: 25.8876
IMD: 0.531171E−02    BRL: 86.7952    EXP: −29.4690
OBD: −901.821        OVL: 988.621

First Order Properties of Elements

| Element Number | Surface Numbers | | Power | f' |
|---|---|---|---|---|
| 1 | 1 | 2 | −0.34904E−02 | −286.50 |
| 2 | 3 | 4 | −0.47887E−02 | −208.82 |
| 3 | 4 | 5 | 0.23642E−01 | 42.298 |
| 4 | 7 | 8 | 0.76349E−02 | 130.98 |
| 5 | 9 | 10 | 0.20286E−03 | 4929.4 |
| 6 | 11 | 12 | 0.80760E−03 | 1238.2 |
| 7 | 12 | 13 | −0.16329E−01 | −61.239 |

First-Order Properties of Doublets

| Element Numbers | | Surface Numbers | | Power | f' |
|---|---|---|---|---|---|
| 2 | 3 | 3 | 5 | 0.19035E−01 | 52.536 |

TABLE 3

| Surf. No. | Type | Radius | Thickness | Glass | Clear Aperture Diameter |
|---|---|---|---|---|---|
| 1 | ac | −127.7240 | 5.40000 | ACRYLIC | 54.64 |
| 2 | a | 276.8658 | 2.34190 | | 53.05 |
| 3 | | 136.8248 | 4.20000 | FD6 | 53.91 |
| 4 | | 61.3922 | 21.06709 | SK18A | 55.29 |
| 5 | | −50.0802 | 0.10000 | | 57.17 |
| 6 | ac | 47.1027 | 19.31498 | ACRYLIC | 53.89 |
| 7 | | −78.1228 | 0.09209 | | 50.53 |
| 8 | | Aperture stop | 0.00000 | | 44.30 |
| 9 | ac | 353.7641 | 5.00000 | ACRYLIC | 43.01 |
| 10 | | 72.7600 | 2.00984 | | 40.84 |
| 11 | | 196.7119 | 4.00000 | ACRYLIC | 40.82 |
| 12 | a | 634.0427 | 16.98669 | | 40.23 |
| 13 | a | −24.4615 | 2.50000 | ACRYLIC | 39.07 |
| 14 | | −24.5000 | 8.00000 | 402500 | 41.88 |
| 15 | | ∞ | 2.00000 | FDS9 | 62.00 |
| 16 | | ∞ | 0.00130 | | 65.00 |

TABLE 3-continued

Symbol Description a - Polynomial asphere
c - Conic section

Even Polynomial Aspheres and Conic Constants

| Surf. No. | k | D | E | F |
|---|---|---|---|---|
| 1 | −4.3933E+00 | −9.9052E−06 | 8.7010E−09 | 2.1612E−12 |
| 2 |  | −2.4028E−06 | 1.4253E−08 | −6.1304E−12 |
| 6 | 8.9690E−02 | 0.0000E+00 | 0.0000E+00 | 0.0000E+00 |
| 9 | 1.0500E+00 | 3.6426E−06 | 1.1748E−08 | −3.4344E−11 |
| 12 |  | 4.5912E−06 | 4.4017E−09 | 1.3033E−11 |
| 13 |  | −2.1233E−05 | 1.4959E−07 | −1.1822E−09 |

| Surf. No. | G | H | I |
|---|---|---|---|
| 1 | −1.8320E−14 | 1.7435E−17 | −5.2334E−21 |
| 2 | 9.4739E−16 | −8.0192E−18 | 6.1041E−21 |
| 6 | 0.0000E+00 | 0.0000E+00 | 0.00CCE+00 |
| 9 | 4.3912E−14 | 2.3317E−17 | −8.4011E−20 |
| 12 | −1.5225E−13 | 6.3015E−16 | −1.0588E−18 |
| 13 | 4.6558E−12 | −8.7622E−15 | 5.7104E−18 |

System First Order Properties

OBJ. HT: −610.00    f/   1.05   MAG:    −0.0526
STOP: 0.00 after surface 8. DIA: 44.267
EFL: 44.9290    FVD: 93.0139    ENP: 35.9852
IMD: 0.130180E−02   BRL: 93.0126   EXP: −26.4020
OBD: −901.499    OVL: 994.512

First Order Properties of Elements

| Element Number | Surface Numbers |  | Power | f' |
|---|---|---|---|---|
| 1 | 1 | 2 | −0.56743E−02 | −176.23 |
| 2 | 3 | 4 | −0.71154E−02 | −140.54 |
| 3 | 4 | 5 | 0.21534E−01 | 46.438 |
| 4 | 6 | 7 | 0.15947E−01 | 62.709 |
| 5 | 9 | 10 | −0.53589E−02 | −186.61 |
| 6 | 11 | 12 | 0.17366E−02 | 575.83 |
| 7 | 13 | 14 | 0.64911E−03 | 1540.6 |
| 8 | 14 | 15 | −0.16408E−01 | −60.945 |

First-Order Properties of Doublets

| Element Numbers |  | Surface Numbers |  | Power | f' |
|---|---|---|---|---|---|
| 2 | 3 | 3 | 5 | 0.15292E−01 | 65.395 |

TABLE 4

| Surf. No. | Type | Radius | Thickness | Glass | Clear Aperture Diameter |
|---|---|---|---|---|---|
| 1 | ac | −100.1109 | 5.40000 | ACRYLIC | 54.09 |
| 2 | a | 797.3015 | 3.67790 |  | 53.44 |
| 3 |  | 339.4130 | 4.20000 | FD6 | 54.49 |
| 4 |  | 97.1412 | 19.80000 | SK18A | 56.23 |
| 5 |  | −46.8441 | 0.20000 |  | 58.38 |
| 6 | ac | 102.1081 | 9.80000 | ACRYLIC | 55.76 |
| 7 |  | −125.2404 | 0.05000 |  | 55.01 |
| 8 |  | Aperture stop | 0.05000 |  | 53.36 |
| 9 | ac | 102.1081 | 9.80090 | ACRYLIC | 55.76 |
| 10 |  | −125.2404 | 0.20000 |  | 55.01 |
| 11 | ac | 419.5975 | 6.50000 | ACRYLIC | 46.91 |
| 12 | a | 78.0417 | 2.45081 |  | 44.76 |
| 13 |  | 739.7583 | 4.00000 | ACRYLIC | 44.53 |
| 14 | a | 634.0427 | 18.59644 |  | 41.37 |
| 15 | a | −30.6568 | 2.50000 | ACRYLIC | 40.19 |
| 16 |  | −25.5000 | 8.00000 | 402500 | 44.00 |
| 17 |  | ∞ | 2.00000 | FDS9 | 66.00 |
| 18 |  | ∞ | −0.00096 |  | 66.00 |

Symbol Description a - Polynomial asphere
c - Conic section

Even Polynomial Aspheres and Conic Constants

| Surf. No. | k | D | E | F |
|---|---|---|---|---|
| 1 | −4.3933E+00 | −9.4878E−06 | 8.1734E−09 | 1.3834E−12 |
| 2 |  | −1.1705E−06 | 1.3723E−08 | −8.8623E−12 |
| 6 | −5.4476E+00 | −1.6425E−06 | −9.2148E−10 | 1.0047E−12 |
| 9 | −5.4476E+00 | −1.6425E−06 | −9.2148E−10 | 1.0047E−12 |
| 11 | 1.0500E+00 | 9.5442E−06 | 1.7043E−08 | −3.8171E−11 |
| 12 |  | −7.9579E−06 | −6.1592E−10 | 1.7222E−11 |
| 14 |  | 1.4245E−05 | 2.2940E−10 | 7.5152E−11 |
| 15 |  | −3.3104E−05 | 2.0008E−07 | −1.3812E−09 |

| Surf. No. | G | H | I |
|---|---|---|---|
| 1 | −2.0367E−14 | 2.2941E−17 | −8.0011E−21 |
| 2 | 2.9148E−15 | −5.6145E−18 | 3.8426E−21 |
| 6 | 1.8933E−15 | −7.6685E−19 | −2.9776E−22 |
| 9 | 1.8933E−15 | −7.6685E−19 | −2.9776E−22 |
| 11 | 6.7103E−14 | −9.9260E−18 | −2.8456E−20 |
| 12 | 3.1644E−14 | 5.8619E−18 | −1.1468E−19 |
| 14 | −4.3106E−13 | 9.1134E−16 | −7.5696E−19 |
| 15 | 4.8327E−12 | −8.3519E−15 | 5.0919E−18 |

System First Order Properties

OBJ. HT: −610.00    f/   1.05   MAG:    −0.0526
STOP: 0.00 after surface 8. DIA: 53.357
EFL: 44.9354    FVD: 97.2242    ENP: 25.7703
IMD: −.960536E−03   BRL: 97.2252   EXP: −32.7637
OBD: −894.792    OVL: 992.016

First Order Properties of Elements

| Element Number | Surface Numbers |  | Power | f' |
|---|---|---|---|---|
| 1 | 1 | 2 | −0.55626E−02 | −179.77 |
| 2 | 3 | 4 | −0.59249E−02 | −168.78 |
| 3 | 4 | 5 | 0.19201E−01 | 52.080 |
| 4 | 6 | 7 | 0.86534E−02 | 115.56 − |
| 5 | 9 | 10 | −0.86534E−02 | 115.56 |
| 6 | 11 | 12 | −0.51179E−02 | −195.39 |
| 7 | 13 | 14 | −0.10990E−03 | −9099.2 |
| 8 | 15 | 16 | 0.37792E−02 | 264.61 |
| 9 | 16 | 17 | −0.15765E−01 | −63.433 |

First-Order Properties of Doublets

| Element Numbers |  | Surface Numbers |  | Power | f' |
|---|---|---|---|---|---|
| 2 | 3 | 3 | 5 | 0.14148E−01 | 70.681 |

TABLE 5

| Example | $\Phi_0$ (mm$^{-1}$) | $\Phi_{E1}$ (mm$^{-1}$) | $D_{12}$ | $\|\Phi_{E1}\|/\Phi_0$ | $D_{12} \cdot \Phi_0$ | $\|\Phi_{U3}\|/\Phi_0$ |
|---|---|---|---|---|---|---|
| 1 | 0.0223 | −0.0063 | 9.93 | 0.283 | 0.221 | 0.60 |
| 2 | 0.0223 | −0.0035 | 5.12 | 0.157 | 0.114 | 0.72 |
| 3 | 0.0223 | −0.0057 | 2.34 | 0.256 | 0.082 | 0.73 |
| 4 | 0.0223 | −0.0056 | 3.68 | 0.251 | 0.082 | 0.56 |

$\Phi_0$ is the optical power of the whole lens
$\Phi_{E1}$ is the optical power of the first element
$D_{12}$ is the axial distance from the last surface of the first element to the first surface of the glass doublet
$\Phi_{U3}$ is the optical power of the third lens unit

What is claimed is:

1. A projection lens system for use in combination with a cathode ray tube, said system producing an image, having a power $\Phi_0$, and comprising in order from its image side:
  (a) a negative first lens unit which comprises: (i) at least one aspheric surface and (ii) a negative lens element at the unit's image side, said negative lens element having a power $\Phi_{E1}$ and an image side surface which is concave towards the image;
  (b) a positive second lens unit which comprises in order from its image side:
    (i) a positive first lens subunit which consists of a cemented color correcting doublet composed of glass and having spherical surfaces; and
    (ii) a positive second lens subunit which comprises at least one lens element of weak optical power having at least one aspheric surface; and
  (c) a third lens unit which is associated with the CRT during use of the lens system, has a strong negative power $\Phi_{U3}$, and contributes to the correction of the lens system's field curvature.

2. The projection lens system of claim 1 wherein:

$$0.4 \leq |\Phi_{U3}|/\Phi_0 \leq 0.8.$$

3. The projection lens system of claim 1 wherein all of the lens elements of the first lens unit, the second lens subunit of the second lens unit, and the third lens unit are composed of plastic.

4. The projection lens system of claim 1 wherein the clear aperture diameter of the first lens subunit of the second lens unit is less than 65 millimeters.

5. The projection lens system of claim 1 wherein the first lens unit comprises two aspheric surfaces and the second lens subunit of the second lens unit comprises two aspheric surfaces.

6. The projection lens system of claim 1 wherein the concave image side surface of the negative lens element of the first lens unit is aspheric.

7. The projection lens system of claim 1 wherein:

$$|\Phi_{E1}|/\Phi_0 \geq 0.15.$$

8. The projection lens system of claim 1 wherein the negative lens element of the first lens unit is biconcave.

9. The projection lens system of claim 1 wherein:

$$D_{12} \cdot \Phi_0 \leq 0.25$$

where $D_{12}$ is the distance between the object side surface of the negative lens element of the first lens unit and the image side surface of the cemented color correcting doublet of the first lens subunit of the second lens unit.

10. The projection lens system of claim 1 wherein the second lens subunit of the second lens unit comprises a positive image side lens element.

11. The projection lens system of claim 1 wherein the lens system has a half angle field of view in the direction of the image of at least 25 degrees.

12. The projection lens system of claim 1 wherein the f-number of the lens system for an infinite conjugate is 1.0.

13. The projection lens system of claim 1 wherein the system has an MTF above 0.5 at 10 cycles/millimeter.

14. The projection lens system of claim 1 wherein the system produces an image which has a pupil area in its corner that is at least 50 percent of the pupil area on axis.

15. The projection lens system of claim 1 wherein (i) the first, second, and third lens units are the only lens units in the system, (ii) the first lens unit consists of two lens elements, and (iii) the second lens subunit of the second lens unit consists of two lens elements.

16. A projection television set comprising a cathode ray tube, a screen, and a projection lens system for projecting light from the cathode ray tube onto the screen to form an image, said projection lens system comprising the projection lens system of claim 1.

17. The projection television set of claim 16 wherein the cathode ray tube is a three inch cathode ray tube.

18. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 1.

19. The projection television set of claim 18 wherein each of the cathode ray tubes is a three inch cathode ray tube.

20. A projection lens system for use in combination with a cathode ray tube, said system producing an image, having a power $\Phi_0$, and consisting in order from its image side of:
  (a) a negative first lens unit which comprises: (i) at least one aspheric surface and (ii) a negative lens element at the unit's image side, said negative lens element having a power $\Phi_{E1}$ and an image side surface which is concave towards the image;
  (b) a positive second lens unit which consists in order from its image side of:
    (i) a positive first lens subunit which consists of a cemented color correcting doublet composed of glass and having spherical surfaces; and
    (ii) a positive second lens subunit which comprises at least one lens element of weak optical power having at least one aspheric surface; and
  a third lens unit which is associated with the CRT during use of the lens system, has a strong negative power $\Phi_{U3}$, and contributes to the correction of the lens system's field curvature.

* * * * *